Nov. 30, 1937. H. B. CUNNINGHAM ET AL Re. 20,562

JOURNAL LUBRICATOR

Original Filed Nov. 15, 1932 3 Sheets-Sheet 1

Homer B. Cunningham,
James W. Tucker,
INVENTORS

BY Victor J. Evans & Co.
ATTORNEY

P. A. Hickey
WITNESS

Nov. 30, 1937. H. B. CUNNINGHAM ET AL. Re. 20,562

JOURNAL LUBRICATOR

Original Filed Nov. 15, 1932 3 Sheets-Sheet 2

Homer B. Cunningham,
James W. Tucker,
INVENTORS

BY Victor J. Evans & Co.
ATTORNEY

P. J. Hickey
WITNESS:

Nov. 30, 1937. H. B. CUNNINGHAM ET AL Re. 20,562

JOURNAL LUBRICATOR

Original Filed Nov. 15, 1932 3 Sheets-Sheet 3

Homer B. Cunningham,
James W. Tucker,
INVENTORS

BY Victor J. Evans & Co.
ATTORNEY

P. J. Hickey
WITNESS:

Reissued Nov. 30, 1937

Re. 20,562

UNITED STATES PATENT OFFICE 20,562

JOURNAL LUBRICATOR

Homer B. Cunningham, Connellsville, and James William Tucker, Pittsburgh, Pa.

Original No. 1,943,298, dated January 16, 1934, Serial No. 642,796, November 15, 1932. Application for reissue December 27, 1935, Serial No. 56,376

8 Claims. (Cl. 308—87)

The invention relates to a journal lubricator and more especially to a journal and hub lubricator and constitutes improvements over the subject matter of applications for United States Letters Patent filed January 18, 1932, Serial No. 587,434, and April 13, 1932, Serial No. 605,082, respectively.

The primary object of the invention is the provision of a journal and a combination journal and hub lubricator of a kind and construction that the journals and hubs of rolling stock will be constantly and continuously lubricated.

Another object of the invention is the provision of a device of this character wherein the journals and hubs, more especially for railway rolling stock, will be positively lubricated, eliminating the costly condition now experienced by railways from hot boxes and hubs and when arranged in the journal or cellar box will require no further attention.

A further object of the invention is the provision of a device of this character, wherein the lubricator is constantly under tension and is sustained in uniform contact with the journal within a journal box, the lubricator being susceptible of yieldability to accommodate itself to the part to be lubricated, such as a journal, and the lubricant will be constantly delivered to the movable surface or surfaces within the journal box so that a thorough lubrication will be maintained under all conditions.

A further object of the invention is the provision of a device of this character wherein the same is of a construction possessing a minimum weight, yet strong, durable, thoroughly reliable and efficient in its purposes, will snugly embrace the bottom of the moving journal and the lower or bottom part of the lubricator being in the very bottom of the box for such journal and both top and bottom, as well as sides, are held in proper position with free flexibility so that the thorough and positive lubrication takes place, the device being easily inspected to determine the functioning of the lubricator at any time, and also one that is inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings.

Similar reference characters indicate corresponding parts throughout the several views in the drawings.

Figure 1:
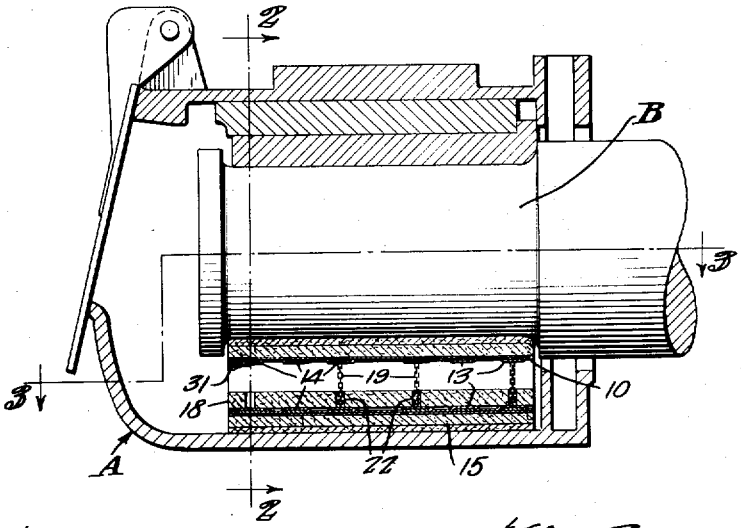
Figure 1 is a fragmentary vertical sectional view through a journal box showing the device constructed in accordance with the invention applied.
Figure 2:
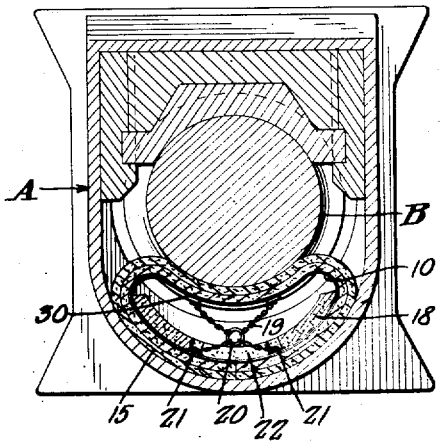
Figure 2 is a sectional view on the line 2—2 of Figure 1 looking in the direction of the arrows.
Figure 3:
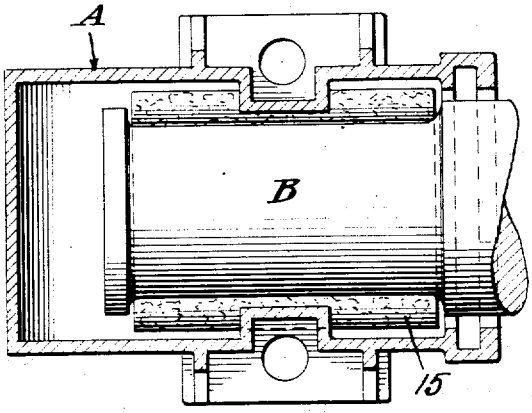
Figure 3 is a sectional view on the line 3—3 of Figure 1 looking in the direction of the arrows.
Figure 4:
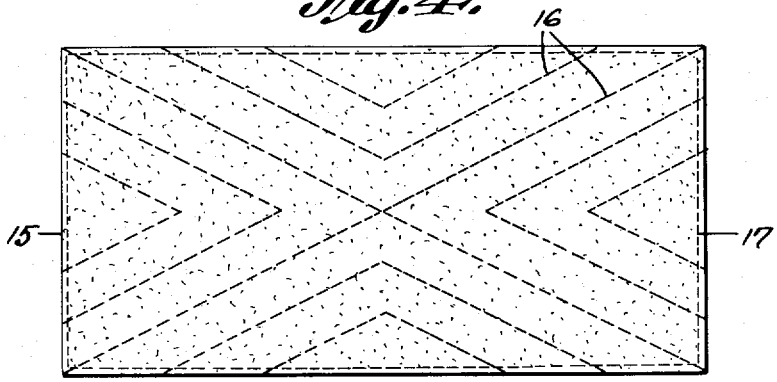
Figure 4 is a plan view of the felt pad of the lubricator, this being the cover or outer section thereof.
Figure 5:
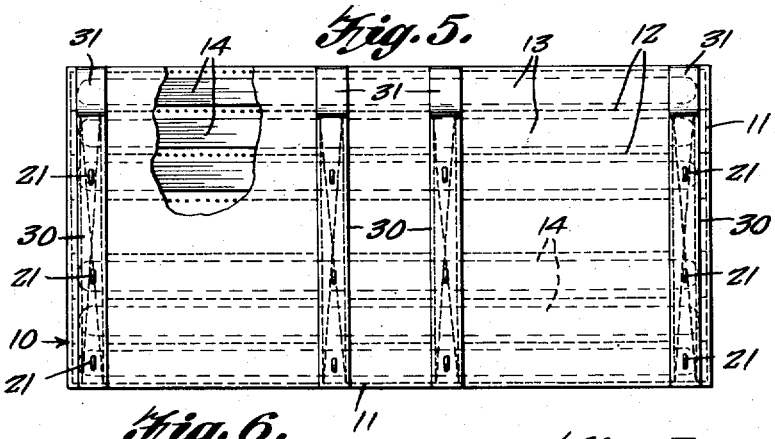
Figure 5 is a plan view of the device with the pad or felt shown in Figure 4 removed and a portion of the device being broken away to illustrate adjuncts.
Figure 6:
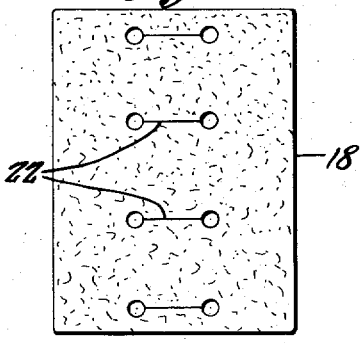
Figure 6 is a plan view of an additional felt or pad for an additional oil reservoir.
Figure 7:
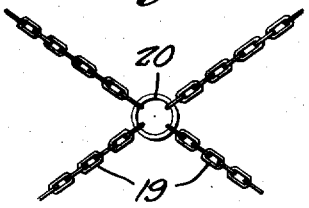
Figure 7 is a detail plan view of a spider-like anchoring or fastener as used in the device for anti-rolling purposes.

Referring to the drawings in detail, particularly Figures 1 to 7 inclusive, A designates generally a portion of a journal box, the same being of conventional or standard form and B the journal fitted within the box, the journal being likewise conventional or of the usual well known construction adaptable for railway rolling stock.

The lubricator comprises a core 10, preferably composed of several pieces of canvas or cloth of proper size and thickness, stitched at 11 together at the ends and sides thereof and additionally stitched at determined intervals as at 12, these stitches running lengthwise of the cloth to provide pockets 13 for accommodating therein throughout the extent of said pockets flexible metal bars or strips 14, these being of proper width, thickness and length and suitably fitted with terminal caps to prevent the cutting of the material at the pocket ends.

The core is formed by rolling the assembled pieces of canvas or cloth and metal strips to bring the ends in contacting or close relation to each other and thereafter joining these abutting ends preferably by stitches (not shown). This shapes the core into a cylinder having circular stiffening springs 14.

Superimposed upon the core prior to the shaping thereof is an external pad or flexible lubricant applicator 15 of one or more pieces of felt or the like, the same being stitched diagonally at intervals as at 16 to give strength and required stiffness thereto. It is advisable to have the outer ply of felt of this pad 15 of good quality as the same takes the wear, if any, while the device is in use, the inner ply or plies of felt being of inferior quality as the same serves as an oil reservoir in the use of the lubricator. The pad 15 is stitched to the core marginally thereof by stitches 17, also at spaced intervals as at 12, thus these becoming a unit.

Arranged within the core 10 is a mat 18 preferably made of freely flexible relatively thick felt and functions as an additional oil reservoir.

The core has fastened interiorly thereof at opposite sides and at spaced intervals the spider-like anchors or fasteners including the chain lengths 19 and a center ring 20 common to and loosely connected with said lengths 19, the chain lengths being fastened at 21 in any suitable manner to the core. The mat 18 is formed with slots 22 providing clearances for the spider-like anchors or fasteners, the latter functioning to prevent the lubricator from rolling or travelling with the journal B as they maintain the lubricator somewhat dished or non-circular in cross-section beneath the said journal B as is clearly shown in Figures 1, 2 and 3 of the drawings.

Figure 8:
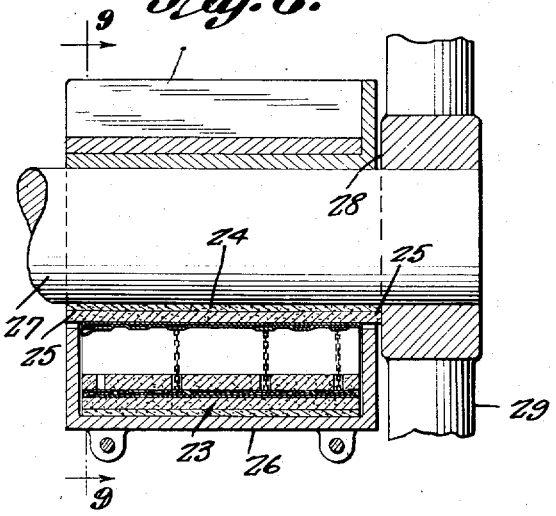
Figure 8 is a view similar to Figure 1 showing a slight modification of the device.
Figure 9:
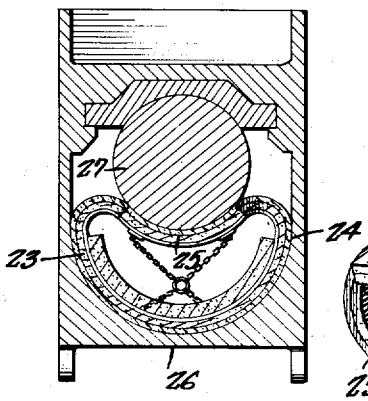
Figure 9 is a sectional view on the line 9—9 of Figure 8 looking in the direction of the arrows.
Figure 10:
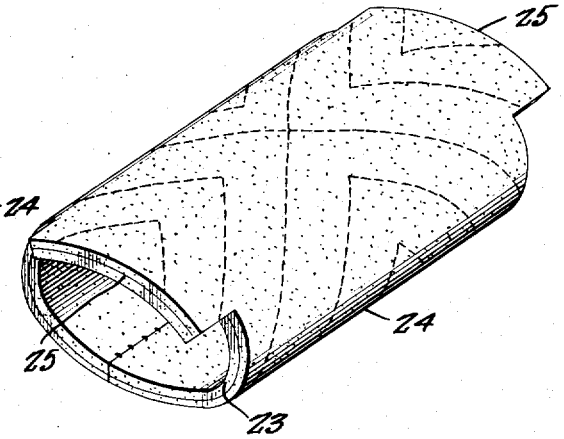
Figure 10 is a perspective view of the modified form of device.

In Figures 8, 9 and 10 there is shown a slight modification of the invention, wherein the core 23 and pad 24 which are alike to these parts hereinbefore described in their make-up, are provided with the end lips 25 and this lubricator is designed to be fitted within a box 26 for a journal 27 so that the outermost lips 25 of both the core and pad will contact with the hub 28 of a wheel 29, thus lubricating not only the journal 27 but also the hub 28 of the wheel.

It should be apparent that the parts 19 and 20 of the spider-like anchors will function as anti-rolling devices to prevent the lubricator from rolling or traveling with the journal, especially during the colder months of the year when lubricant is chilled.

The design and construction of the lubricator enables a saving of labor expense in the inspection of journal wedges and brasses and replacing of the same as it will not be necessary to remove the lubricator from the journal box when doing work of this nature.

An important item for the invention of this type is the reduced cost in the manufacture of the lubricator, as it is inherently strong and in the making requires no special tools nor is it necessary for the use of tools in the application and removal of such device.

The device as shown in Figures 1 to 7 of the drawings has its core 10 provided with transverse straps 30 forming hand loops 31, these facilitating the removal of the device when within the journal box as should be apparent.

What is claimed is:

1. A lubricator of the character described comprising a cylindrical flexible core having resilient inserts spaced from each other and circumferentially of the core, a pad carried by the core, a mat held within the core, and anchoring spiders connected interiorly of the core and passed through the mat.

2. A lubricator of the character described comprising a cylindrical flexible core having resilient inserts spaced from each other and circumferentially of the core, a pad carried by the core, a mat held within the core, anchoring spiders connected interiorly of the core and passed through the mat, and lips extending from opposite ends of the core and pad.

3. A lubricator of the character described comprising a cylindrical flexible core having resilient inserts spaced from each other and circumferentially of the core, a pad carried by the core, a mat held within the core, anchoring spiders connected interiorly of the core and passed through the mat, and lips extending from opposite ends of the core and pad, the said core being formed from fabric.

4. A lubricator of the character described comprising a cylindrical flexible core having resilient inserts spaced from each other and circumferentially of the core, a pad carried by the core, a mat held within the core, anchoring spiders connected interiorly of the core and passed through the mat, and lips extending from opposite ends of the core and pad, the said core being formed from fabric, the said pad and mat being formed from felt.

5. A lubricator of the character described comprising a hollow flexible lubricant applicator of material suitable for conveying lubricant to and wiping it onto a moving surface and means within the applicator, extending across the space therein and connected with the applicator at opposite sides of said space for preventing rotation thereof due to movement of said surface.

6. A lubricator of the character described comprising a hollow flexible lubricant applicator for conveying lubricant to and wiping it onto a moving surface and means comprising crossed chains connecting generally opposed portions of the applicator and extending across the space therein for maintaining the applicator non-circular in cross section and to prevent rotation thereof due to movement of said surface.

7. A lubricator of the character described comprising a peripherally closed hollow flexible lubricant applicator of material suitable for conveying lubricant to and wiping it onto a moving surface in contact with the applicator and which surface tends upon movement to cause the applicator to rotate, and means connected with the applicator at opposed portions thereof and extending across the space therewithin and maintaining such opposed portions against separation to such an extent of separation as would permit the applicator to rotate due to movement of said surface.

8. A lubricator of the character described comprising a peripherally closed hollow flexible lubricant applicator of material suitable for conveying lubricant to and wiping it onto a moving surface in contact with the applicator and which surface tends upon movement to cause the applicator to rotate, and flexible tension means connected with the applicator at opposed portions thereof and extending across the space therewithin and maintaining such opposed portions against separation to such an extent of separation as would permit the applicator to rotate due to movement of said surface.

HOMER B. CUNNINGHAM.
JAMES WILLIAM TUCKER.